Figure 1:
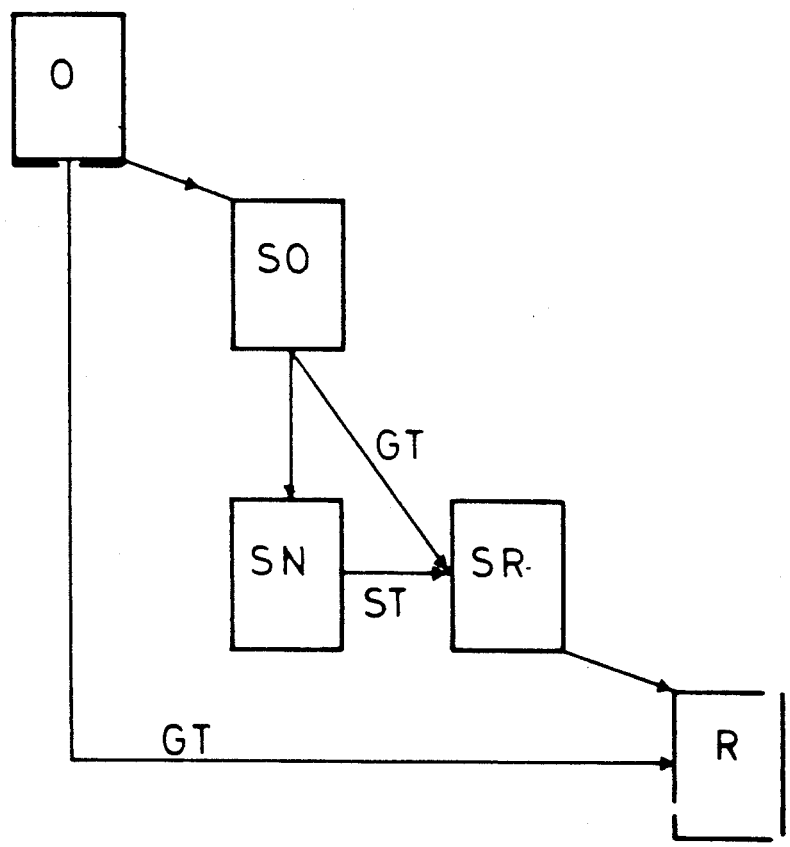

United States Patent [19]

Vinck

[11] Patent Number: 5,218,434
[45] Date of Patent: Jun. 8, 1993

[54] COMPUTERIZED METHOD OF REPRODUCING AN ORIGINAL IMAGE USING A SET OF STANDARD ORIGINALS

[75] Inventor: Paul W. Vinck, Hove, Belgium

[73] Assignee: Agfa-Gevaert N. V., Mortsel, Belgium

[21] Appl. No.: 608,800

[22] Filed: Nov. 5, 1990

[30] Foreign Application Priority Data

Nov. 20, 1989 [EP] European Pat. Off. .... EP-8920936.4

[51] Int. Cl.$^5$ .............................................. H04N 1/46
[52] U.S. Cl. ...................................... 358/80; 358/75; 358/76
[58] Field of Search ............... 358/75, 76, 80, 406; 382/36

[56] References Cited

U.S. PATENT DOCUMENTS

| | | | |
|---|---|---|---|
| 5,012,333 | 4/1991 | Lee et al. | 358/76 |
| 5,142,593 | 8/1992 | Kasano | 382/36 |
| 5,157,506 | 10/1992 | Hannah | 358/80 |

FOREIGN PATENT DOCUMENTS 0400991 12/1990 European Pat. Off. .............. 358/80

Primary Examiner—Edward L. Coles, Sr.
Assistant Examiner—Jill Jackson
Attorney, Agent, or Firm—William J. Daniel

[57] ABSTRACT

A method of reproducing an image according to non-standard reproduction rules wherein classification schemes of standard originals and of standard reproductions are used and wherein the rules for reproducing said image are determined from relations between said originals and between said reproductions and from transformations of said originals into said reproductions.

4 Claims, 5 Drawing Sheets

| CONTRAST | TONE | EXPOSURE | | |
|---|---|---|---|---|
| | | UNDER-EXPOSED | NORMAL | OVER-EXPOSED |
| HIGH | 1/4 | | | |
| | 1/2 | | | |
| | 3/4 | | | |
| NORMAL | 1/2 | | | |
| | 1/2 | | | |
| | 3/4 | | | |
| LOW | 1/4 | | | |
| | 1/2 | | | |
| | 3/4 | | | |

$D_{max}$
$D_{min}$
TI
CI

COMPUTERIZED METHOD OF REPRODUCING AN ORIGINAL IMAGE USING A SET OF STANDARD ORIGINALS

BACKGROUND OF THE INVENTION

1. Field of the Invention

The present invention relates to a method of reproducing an original. More specifically the present invention relates to a method of determining a transformation for producing colour separations of an original that are suitable for reproducing an original according to non-standard reproduction rules.

2. Description of the Prior Art

In a graphic arts reproduction process a full colour reproduction is obtained by printing with at least three basic colour inks separately, one after the other in perfect register.

It is possible to reproduce most full colour copies by the use of three primary colour inks cyan, magenta and yellow. In most cases an extra printing cycle with black ink is performed to obtain good printing quality.

The printing plates for printing in register with each of said primary colours are produced by means of a set of primary colour separations of the full colour original that is to be reproduced.

The colour separations made from a colour original are commonly obtained by means of a reproduction camera or by means of an electronic colour separator, also called a colour scanner.

In such a colour scanner, a light-beam is used to scan an original and to measure the density in each minute area of the original through each of a set of primary colour filters. The density values are converted into electrical signals and are used for controlling a light source for exposing photographic film in order to produce colour separations.

An electronic colour scanner is useful for obtaining colour separations much faster than with the aid of a reproduction camera. However, it is a rather complex apparatus and demands a lot of experience of the operator. The scanner must be adjusted according to the specific reproduction process that will be used, the characteristics of an original and the individual desires of a client.

For example, corrections may have to be implemented for matching the colour characteristics and density range of e.g. a colour film original, the reproducing material and the printing inks.

So, due to the various types of originals that are to be reproduced, the interpretation of an original that is to be performed by the scanner operator, the knowledge of the reproducing process and the apparatus capabilities, the process of obtaining colour separations is made rather complex and dependent on the operator's skill and experience.

Even through manipulation of the scanner by highly skilled operators, mutual differences still exist between reproductions made by different operators due to their different personal interpretation of the coloured originals.

An objective technique of interpreting an original and adjusting an electronic scanner in accordance with such interpretation or in accordance with the desired reproduction result would therefore be very helpful.

A prior art proces for classifying an original to be reproduced and for adjusting a scanner set up has been described in U.S. Pat. No. 4,472,736.

According to this classifying process a number of "standard reproductions" are selected from a large number of high quality reproductions. Standard density distribution patterns of these standard reproductions are obtained and stored. The density distribution pattern of an original to be reproduced is then compared with the density distributions of said standard reproductions. One of the standard density distribution patterns of the standard reproductions which is closest to that of the original to be reproduced is then selected and the original to be reproduced is classified in the class of said selected standard reproduction.

A colour separation tone curve is implemented on a scanner by determining set values for the adjustment controls of the scanner.

According to this prior art method, these set values are determined so as to enable faithful reproduction of the high quality standard originals on the scanner.

Then a standardized pattern of the original to be reproduced, comprising at least the cumulative density values with respect to the entire density range, is formed. This pattern is compared with the patterns in respect of the standard reproductions and a pattern that is similar to that of the standard reproduction is selected.

The scanner set up values corresponding to the standard reproduction having the selected density distribution pattern is used for reproduction of the original.

Experience and practice have established that the originals to be reproduced are far from being "high quality" originals and very often the client wishes to have these originals reproduced as "high quality" reproductions or to have made specific modifications to the reproduction which are not part of a standard reproduction process aiming at a "true, faithful" reproduction.

The prior art method hereinbefore described does not provide a procedure for obtaining a high quality reproduction of an original (more specifically a corrected, modified reproduction) which is not a "high quality" original.

SUMMARY OF THE INVENTION

Object of the invention

It is an object of the present invention to provide a method of reproducing an image whereby subjective interpretations of the original and interventions by the operator making the reproduction are reduced to a minimum.

It is a further object of the present invention to provide a method for producing an image with modified characteristics (e.g. with a modified tone curve).

Further objects of the invention will become clear from the description hereinbelow.

Statement of the invention

The present invention thereto provides a method of reproducing an original (O) comprising the steps of
1) composing a classification scheme comprising a set of originals, taken as standard originals (SR), by assigning to each of said standard originals an expert evaluation on the photographic characteristics of said originals, 2) classifying said original image "O" by comparing it with said standard originals and by selecting a first standard original (SO₁) having substantially identical characteristics,
3) composing a second classification scheme comprising reproductions of said standard originals according to standard reproduction rules and selecting out of said second classification scheme a standard reproduction (SR) having the characteristics that are envisioned for the reproduction "R" of said original "O",
4) selecting from said classification scheme of standard originals resulting from step 2 a second original (SN) that according to standard reproduction rules would be reproduced into standard reproduction "SR",
5) determining a transformation (GT) for reproducing said original "O" according to the characteristics of said standard reproduction "SR" by means of a known relation between said first standard original "SO" and said second standard original "SN" and a transformation for transforming said second standard original "SN" into a faithful reproduction "SR", and using said transformation for reproducing image "O" as reproduction "R" having the characteristics of standard reproduction "SR".

The present invention can be used in all kinds of reproduction and proofing processes, for example in printing processes using colour separations that are obtained by means of a colour scanner, or in thermal transfer processes or in diffusion transfer processes.

Figures 2, 3:
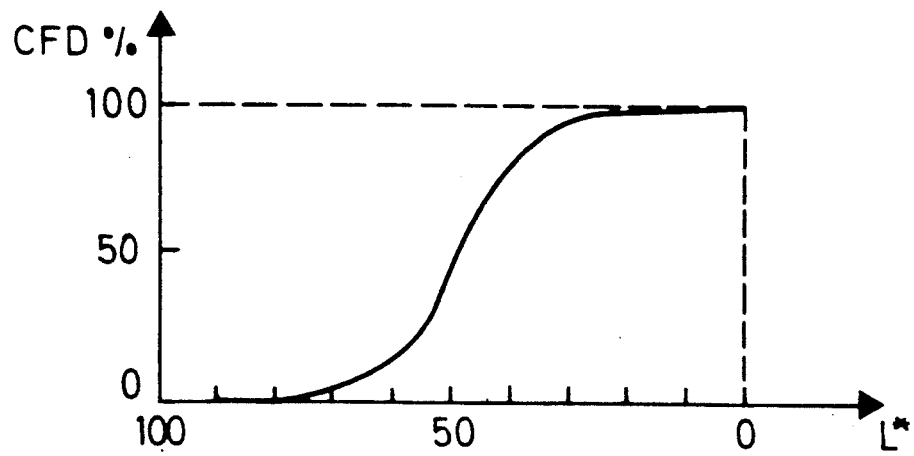

For a better understanding of the present invention reference is made to the following detailed description of the invention given in connection with the accompanying drawings, in which FIG. 1 is a scheme that illustrates the method of the present invention by means of a specific example, FIG. 2 shows an example of a cumulative frequency distribution, FIG. 3 is a classification scheme of standard originals according to tone, exposure, and contrast.

Figure 4:
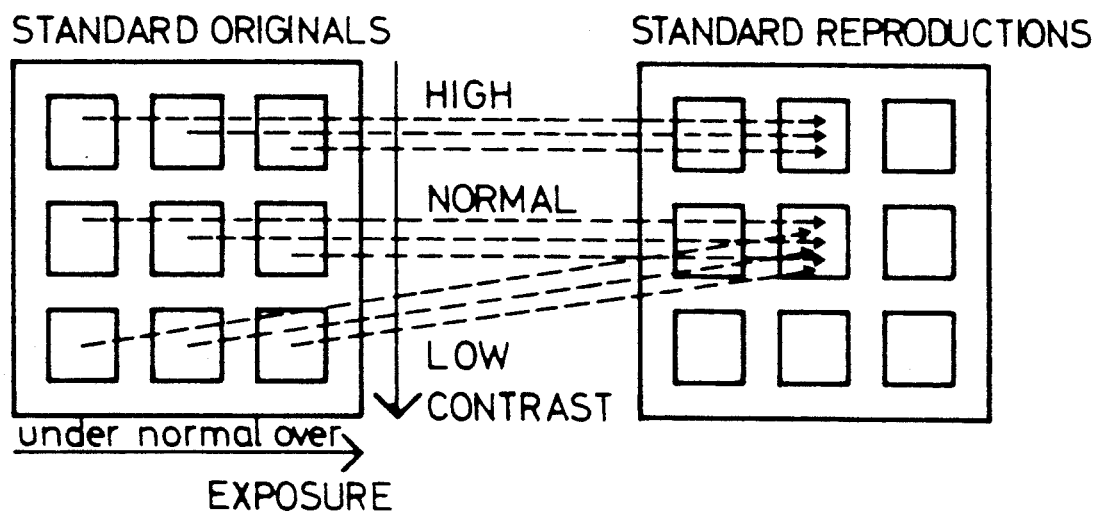
Figure 5:
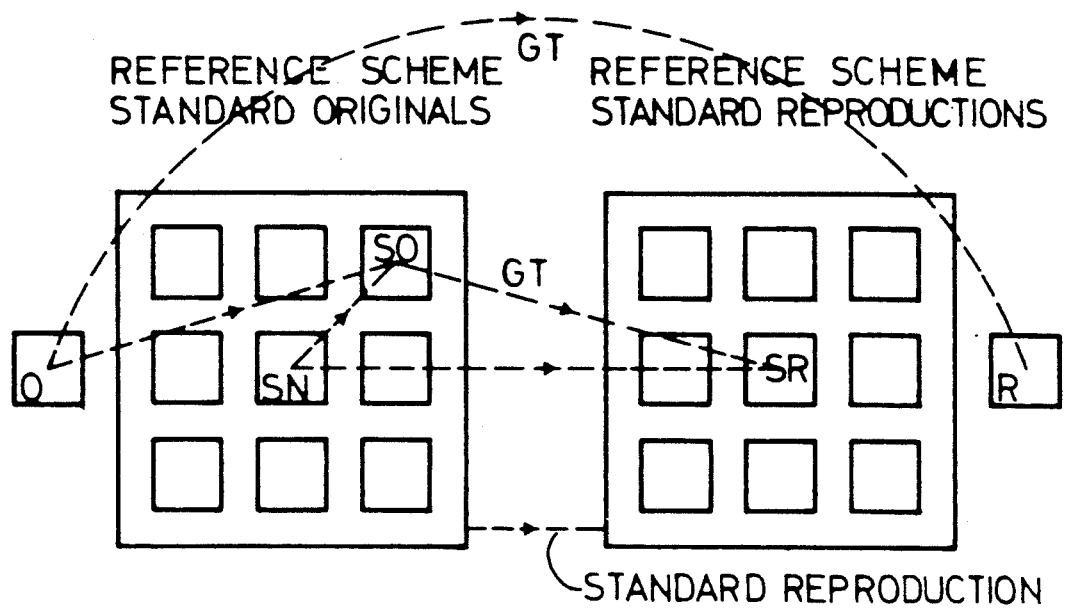
Figure 6:
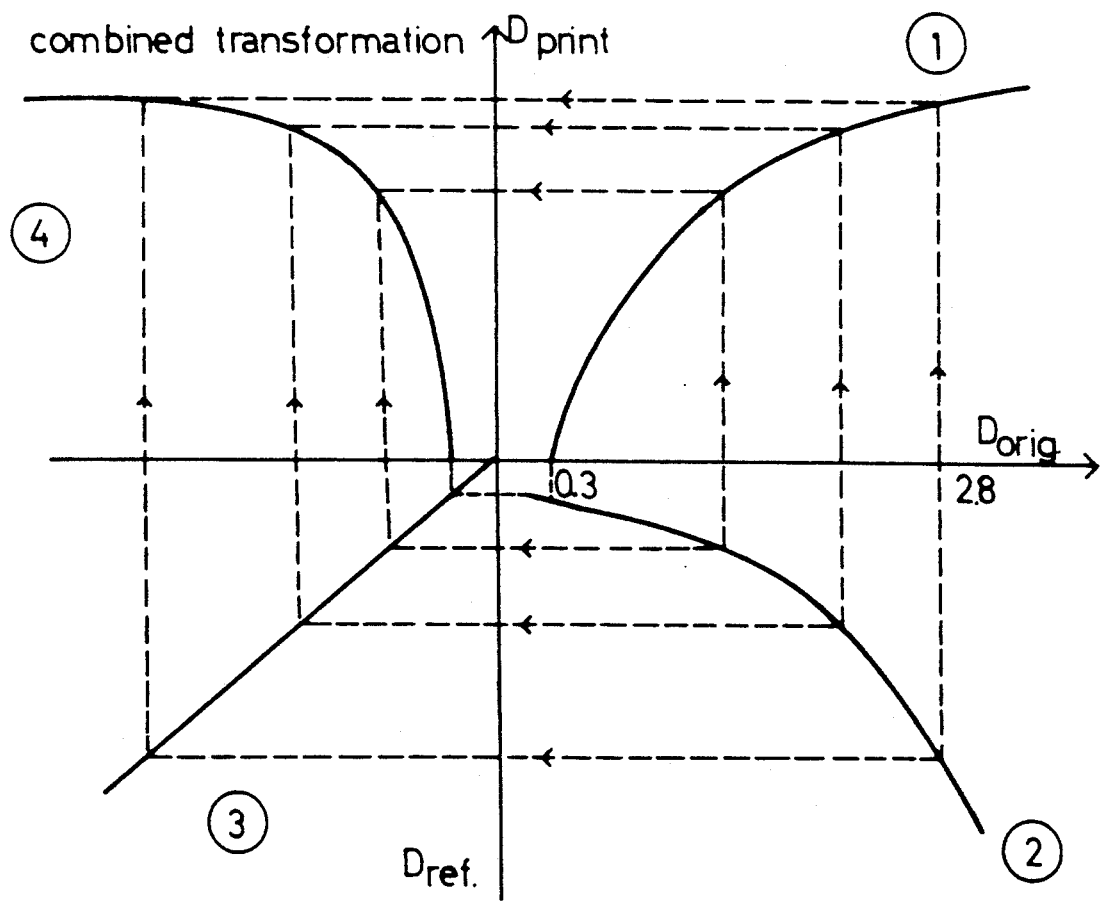
Figure 7:
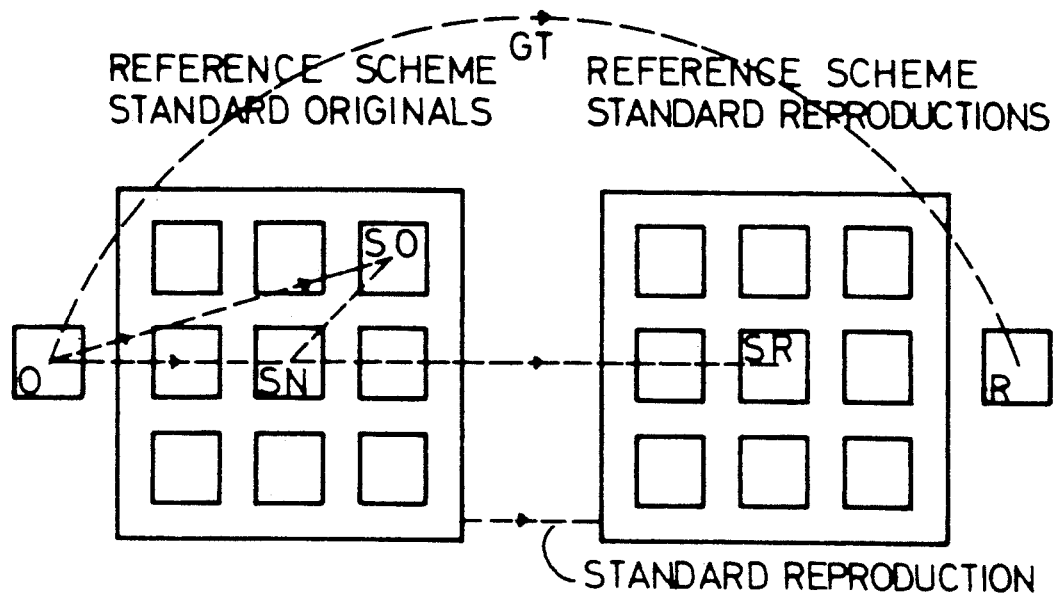
Figure 8:
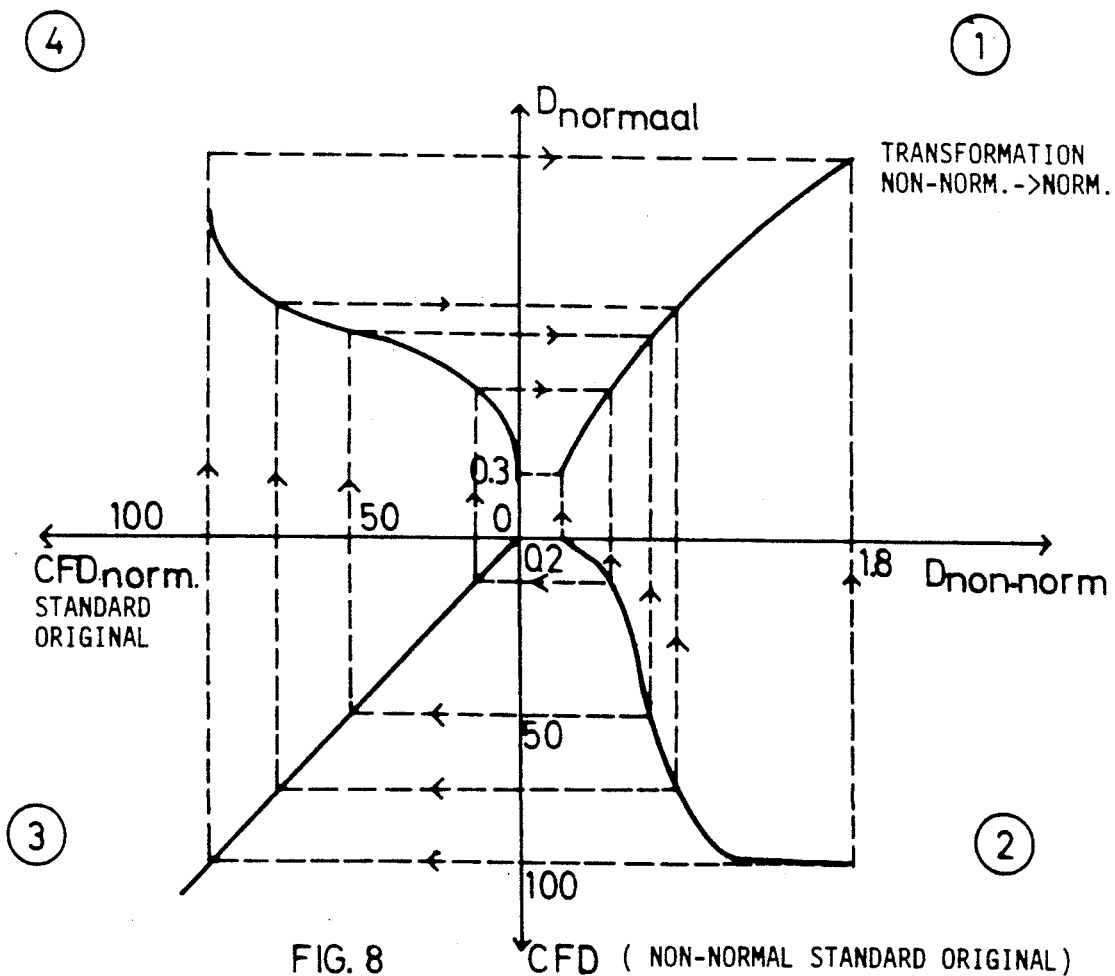

FIG. 4 illustrates the relation between the "original" classification scheme and the "reproduction" classification scheme, FIG. 5 is a scheme illustrating step 4 of the present invention, FIG. 6 is an illustration of the determination of the combined transformation for reproducing an original according to the present invention, FIG. 7 is a scheme illustrating an alternative for step 4 of the present invention, FIG. 8 is an illustration of the determination of the transformation of said alternative.

With reference to FIG. 1 a general explanation is given of the method of the present invention applied to a specific example, namely to the reproduction of an original 'O' having non-optimal photographic characteristics (e.g. an over-exposed original) that is to be reproduced as a good photographic reproduction 'R' (namely a reproduction that would have been obtained had the original been normally exposed).

A set of standard originals of different photographic quality which are representative of the different originals that may be encountered, is selected and arranged in a kind of classification scheme on the basis of an expert evaluation (this is an opinion on the photographic characteristics of the original rendered by an expert in the field) given for each of these standard originals. The interrelationships between the different standard originals are known.

A detailed explanation of the selection of these standard originals and of the construction of the classification is given furtheron in this description.

Next, the original 'O' to be reproduced is compared with each of the standard originals and the most similar standard original 'SO' is selected. The original 'O' inherits the expert opinion of said most similar standard original 'SO'.

For example, if the original 'O' is most similar to a standard original that was judged to be an over-exposed, mid-tone, normal contrast original (this is then the expert opinion applied to the standard original), original 'O' inherits this evaluation.

Next, a standard reproduction 'SR' is selected having the characteristics which are the envisioned characteristics for the reproduction 'R' of the original 'O'. For example, a reproduction of a normally exposed, mid-tone, normal contrast original is selected.

From the classification scheme of the standard originals, a second standard original 'SN' can be found which yields a reproduciton made according to standard reproduction rules that results in standard reproduction 'SR'.

From the classification of the standard originals a relation can be identified between the first standard original 'SO' and the second standard original 'SN', on the other hand the standard reproduction rules (standard transformation ST) are known in the art for obtaining a normal reproduction 'SR' of standard original 'SN'. By means of the above relation and the standard transformation ST a transformation GT can be determined to reproduce standard original 'O' as a reproduction showing the same photographic characteristics as standard reproduction 'SR'.

This transformation GT is used to make a reproduction 'R' of original 'O'.

The following is a detailed description of each of the steps of the present invention.

Step 1:

According to the first step of the present invention a set of "standard originals" is selected and a "knowledge representation", namely a kind of classification or scheme comprising numerical data and an expert evaluation of these standard originals, is created.

The term "standard original" as used in the description and the claims refers to typical or representative originals which are used as standards for comparing and classifying other originals that are to be reproduced. The standard originals are both of good and of poor quality. An adequate number of standard originals is chosen so as to be representative for all possible original images that might become subject to the reproduction process.

The composition of this set is preferably tuned to the specific field (information content) of the reproduction tasks.

In a specific embodiment of the present invention, standard originals are classified according to their tone value, contrast and exposure condition.

It will be clear that the selection of these parameters is not intended to be limitative of the present invention and that other or more parameters might be selected.

Practice has shown that preferably a set of standard originals is composed starting from a picture having a certain tone value and by producing from that picture copies having deviating contrast and exposure values on the photographic material that is going to be used in the system.

The numerical date for the standard originals are obtained in the following way. The standard originals are read and converted into an electrical (digital) representation. The electrical representation is fed into a computer and stored in the computer.

In a specific embodiment the standard originals (and later also the original to be reproduced) are read by means of a colour video camera (but other suitable means such as a scanner may be used). The density (or intensity) value is measured in 256 times 256 pixels. The R G B (red-green-blue) signal from the video camera is applied to a processing unit of a computer. By means of the output signal of the video recorder the luminance value or a psychometrically weighted luminance value in each of the measured pixels is calculated. These values form a file that is stored e.g. in digital form.

The following formula can be used $Y = K_1 R + K_2 G + K_3 B$ wherein Y represents the luminance value, $K_1$, $K_2$ and $K_3$ are parameters; R, G, and B are linear transmission or reflection values, respectively of the video camera measured through red, green and blue colour filters.

A psychometrically weighted luminance signal is obtained by the following formula $L^* = 116 (Y/Y^*)^{\frac{1}{3}} - 16$ wherein Y is obtained by application of the preceding formula, $Y^*$ is a luminance signal corresponding with a white reference.

Next the representation of the standard originals in the form of psychometrically weighted luminance values is analysed statistically by calculating a number of characteristic data for each standard original.

Suitable data are for example the frequency distribution and cumulative frequency distribution of the density values of the standard originals, the minimum and maximum density, the 50% density value etc.

In a preferred embodiment a computation is effected so as to calculate the frequency of a series of luminance intervals equally distributed within the luminance range.

Then the cumulative frequency distribution is calculated.

This cumulative frequency distribution is representative of the image information.

An example of such a cumulative density distribution is shown in FIG. 2.

From said cumulative frequency distribution curve the following specific data are derived:

the minimum and the maximum density value giving an indication on the density range of the original ($D_{min}$ and $D_{max}$), the tone indication TI representing the ratio of $L_{max}$ minus $L_{50\%}$ to $L_{max}$ minus $L_{min}$, wherein $L_{50}$ represents the luminance value corresponding with a cumulative frequency of 50%, (this tone indication is a measure of the tone composition of the original), and a contrast indication CI given by the following formula:

$$CI = \frac{\int_{L_{max}}^{L_{50}} CFD + \int_{L_{50}}^{L_{min}} (100 - CFD)}{50 \times (L_{max} - L_{min})}$$

wherein CFD represents the cumulative frequency distribution curve mentioned above, and $L_{50}$ represents the luminance value corresponding with a cumulative frequency of 50%.

The cumulative frequency distribution and the calculated photographic characteristics are stored in the computer's memory.

For each of the standard originals an expert evaluation of the photographic characteristics of the original is obtained. As was already mentioned, such an expert evaluation might for example be an evaluation of the tone, the exposure and the contrast of the original that has been read by the video camera (for example midtone, over-exposed, high contrast).

With the aid of the expert evaluations in respect of the standard originals and the stored data a kind of reference or classification scheme is built up (stored in the computer's memory) in which to each set of data representative of a standard original and corresponding expert opinion a class is assigned. A scheme of this kind is illustrated in FIG. 3. This scheme shows a classification of 27 standard originals according to their contrast (high, normal, low), tone ($\frac{3}{4}$, $\frac{1}{2}$ and $\frac{1}{4}$) and esposure (under-exposed, normal, over-exposed).

By means of this classification it is possible to retrieve for a certain standard original other members of the classification scheme. When for example an over-exposed, mid-tone, high contrast original is selected, one can easily find the normally exposed and the under-exposed, mid-tone, high contrast originals and the mathematical interrelationships between these standard originals can also be computed by means of the numerical data hereinbefore described.

Step 2:

At this moment the data base comprising the standard originals, also called the "knowledge representation" is composed.

In the second step of the method of the present invention an original image to be reproduced is classified by performing the following steps. First, the original image or part thereof is converted into its electrical representation (by means of for example a video camera or a scanner, in a similar way as performed with the standard originals); the electrical data are converted into psychometrical luminance values by using the above-described formula and are stored in the computer's memory. Next, the same numerical data as were determined for the standard originals are calculated for the original to be reproduced.

For each of the standard originals the result of the following formula is calculated and the standard original that gives the minimum value is selected (further called standard original 'SO'; cfr. FIG. 1):

$$(\text{Theta})^2 = k_1(\text{delta } D_{min})^2 + k_2(\text{delta } D_{max})^2 + k_3(\text{delta } TI)^2 + k_4(\text{delta } CI)^2$$

wherein
$k_1$, $k_2$, $k_3$, $k_4$ are empiricaly determined weight factors;
delta $D_{min} = D_{min}$ (original) $- D_{min}$ (standard original);
delta $D_{max} = D_{max}$ (original) $- D_{max}$ (standard original);
delta TI = TI (original) $-$ TI (standard original); and
delta CI = CI (original) $-$ CI (standard original)

The original to be reproduced inherits the expert opinion that was given to this selected standard original. For example, if the minimum value corresponds with a standard original that was classified as a "mid-tone, over-exposed, high contrast original", then the original to be reproduced will inherit this expert opinion and will be treated as being a "mid-tone, over-exposed, high contrast original".

It is further possible to add to this qualification step an evaluation of the reliability of the qualification. This step comprises an evaluation of the standard deviation of the results of the above formula and of the value of (theta)$^2$.

Step 3:

The third step of the method of the present invention relates to the selection of the standard reproduction with the envisioned characteristics.

First the reproductions are deduced from the reference scheme of standard originals. These reproductions are obtained by the application of a standard reproduction rule known in the art. A description of these standard reproduction rules can for example be found in the following handbook: Yule J. A. C., Principles of Colour Reproduction, John Wiley and Sons Inc., New York 1967.

In practice, the expert evaluation corresponding with the standard originals remain valid for the reproductions hereof.

Next, the reproduction having the characteristics that are envisioned for the reproduction of the original is selected by the user of the system.

Alternatively, the system can be programmed so as to relate a certain type of reproduction to a certain type of original (the type of original being defined by the class of standard originals into which it has been classified) so that the reproduction is predefined.

FIG. 4 illustrates this alternative method step. In this figure a scheme of standard originals on the one hand and a scheme of standard reproductions on the other hand is illustrated. The arrows between the elements of the "original-scheme" and the "reproduction-scheme" illustrate an example of how such an interrelation can be programmed. In this specific example every deviation of the exposure relative to normal exposure in an original is normalised and low-contrast in the original is changed into normal contrast in the reproduction.

Step 4:

In the fourth step a standard original 'SN' is selected that would be reproduced as the reproduction specified in the previous step when standard reproduction rules would have been applied.

Step 5

Step 5 relates to the determination of a transformation for reproducing an original according to non-standard reproduction rules.

This step will be explained hereinbelow with reference to FIGS. 5 and 6. Previous to this step, the classification of an original to be reproduced was performed according to step 2 of the present invention (original 'SO' being selected), followed by the specification of a reproduction as performed in step 3 of the present invention (reproduction 'SR' being selected).

Then, a standard original 'SN' was selected in accordance with step 4 of the present invention that would be reproduced as the reproduction selected in step 3 when standard reproduction rules would have been applied.

Next, a relation is determined for transforming the selected standard original 'SO' into the standard original 'SN'.

Then a combined transformation 'GT' (non-standard reproduction) is determined for reproducing the standard original 'SO' corresponding with the classified original (namely the original that is to be reproduced) into the specified reproduction 'R'.

Next, this combined transformation 'GT' is applied to the original 'O' to be reproduced.

If the original to be reproduced does not diverge a lot from the selected standard reproduction, the transformation is applied as such. Otherwise, if the cumulative frequency distribution of the original to be reproduced, is situated in between that of two standard originals, interpolation might become necessary.

FIG. 6 illustrates how such a combined transformation 'GT' is determined. In the first quadrant (quadrants are numbered in the figures) a reproduction curve of a common printing process is shown. In the second quadrant the relation between the selected standard original 'SO' and the standard original 'SN' is shown. (This corresponds with step 4).

The fourth quadrant shows the combination of the curves of quadrant 1 and 2.

The combined transformation is implemented on a reproduction scanner by adjusting the minimum and maximum density and by adjusting the tone correction for high light, mid tone and shadow parts.

Alternatively a reproduction of an original according to non-standard reproduction rules can be obtained by performing a standardization step prior to the reproduction step according to normal reproduction rules. Therefore a normalisation transformation is performed on the data of the original prior to a standard reproduction by means of the scanner.

This step will be explained hereinbelow with reference to FIGS. 7 and 8.

Previous to this step the original was classified by selecting a standard original 'SO' according to step 2 of the method of the present invention, and a standard reproduction 'SR' was specified following step 3 of the present invention.

Then a standard original 'SN' was selected that would have been reproduced as a result of the reproduction specified in the previous step if standard reproduction rules had been applied.

Because the reproductions are deduced from the classification of the standard originals, this step is implicitely performed in the previous step.

Next a transformation is determined for transforming the selected standard original 'SO' into the standard original 'SN'.

The transformation is applied to the original to be reproduced before the standard reproduction is applied.

FIG. 8 illustrates the determination of said transformation for a specific example in which a non-normal standard original, e.g. an over-exposed standard original is transformed into a normally exposed standard original. The over-exposed standard original is represented by its cumulative frequency distribution in the second quadrant while the normally exposed standard original is represented by its cumulative frequency distribution in the fourth quadrant. The transformation curve is depicted in the first quadrant of this figure.

This transformation is then applied to the original to be reproduced.

If the original too be reproduced diverges not to much from the selected standard reproduction, the transformation is applied as such. Otherwise, if the cumulative frequency distribution is situated in between that of two standard originals, interpolation might become necessary.

I claim:

1. A method of reproducing an original image (O) which comprises the steps of:
   1) Composing a first classification scheme for a set of standard originals by assigning to each of said originals an expert evaluation of selected photographic characteristics thereof,
2) Classifying said original image (O) with respect to said first classification scheme by comparing it with said standard originals so classified and by means of the comparison selecting from said set of standard originals a first standard original (SO) which is substantially identical in said selected photographic characteristics to said original image,
3) Composing a second classification scheme for reproductions of said set of standard originals which are reproduced therefrom according to standard reproduction rules and selecting by means of said second classification scheme a standard reproduction (SR) having the selected photographic characteristics that are envisioned for a reproduction (R) of said original image,
4) Selecting from said first classification scheme a second standard original (SN) that would yield said standard reproduction (SR) when reproduced according to standard reproduction rules,
5) Determining a transformation (GT) for reproducing said original image (O) according to the characteristics of said standard reproduction (SR) by means of a) a known relation between said first standard original (SO) and said second standard original (SN) and b) a transformation for transforming said second standard original (SN) into a faithful reproduction (SR), and
6) Using said transformation (GT) for obtaining from said original image (O) a reproduction (R) having the characteristics of said standard reproduction (SR).

2. The method of claim 1 wherein at least said first classification scheme is composed by the steps comprising:
1) Generating a digital representation of each standard original in said set of standard originals,
2) By means of said digital representations determining specific numerical values related to the selected photographic characteristics of each standard original in said set,
3) Making an expert evaluation of such selected photographic characteristics of each standard original in said set, and
4) Arranging said specific numerical values for the selected characteristics of said set of standard originals and the expert evaluations thereof into said first classification scheme.

3. A method according to claim 2 wherein said original image is classified with respect to said first classification scheme by the steps comprising:
1) Generating a digital representation of said original image,
2) Determining by means of the digital representation of said original image specific numerical values related to the same selected photographic characteristics thereof,
3) Comparing the specific numerical values of said original against the specific numerical values for said set of standard originals arranged ordered into said first classification scheme, and
4) Selecting as the standard original (SO) from the set of standard originals that standard original having specific numerical values most similar to the specific numerical values of said original image.

4. The method according to claim 2 wherein the selected photographic characteristics of said standard originals (SO) include density and luminance and further comprising the steps of measuring from each said standard original (SO) a series of density values and a series of luminance values corresponding to said standard original, analyzing the frequency distribution and cumulative frequency distribution of said series of density values and luminance values, and calculating as the specific numerical values related to the density and luminance of each said standard original a maximum density value ($D_{max}$), a minimum density value ($D_{min}$), a maximum luminance value ($L_{max}$), a minimum luminance value ($L_{min}$), a tone indication (TI) calculated as the ratio of $L_{max}$ minus $L_{50}$ to $L_{max}$ minus $L_{min}$, wherein $L_{50}$ is a luminance value corresponding with a cumulative frequency of 50% measured on the cumulative frequency distribution of the luminance values of said standard original, and a contrast indication (CI) obtained from the following formula $$CI = \frac{\int_{L_{max}}^{L_{50}} CFD + \int_{L_{50}}^{L_{min}} (100 - CFD)}{50 \times (L_{max} - L_{min})}$$

wherein CFD represents the cumulative frequency distribution of luminance values of said standard original and $L_{50}$ is the luminance value corresponding to a cumulative frequency of 50%.

* * * * *

UNITED STATES PATENT AND TRADEMARK OFFICE
CERTIFICATE OF CORRECTION

PATENT NO. : 5,218,434

DATED : June 8, 1993

INVENTOR(S) : PAUL W. VINCK

It is certified that error appears in the above-identified patent and that said Letters Patent is hereby corrected as shown below:

Col. 10, line 14, delete "ordered".

Signed and Sealed this

Fourteenth Day of December, 1993

Attest:

BRUCE LEHMAN

Attesting Officer    Commissioner of Patents and Trademarks